(12) United States Patent
Chiarini

(10) Patent No.: US 8,479,990 B2
(45) Date of Patent: Jul. 9, 2013

(54) PORTABLE DATA COLLECTION APPARATUS

(75) Inventor: Alessandro Chiarini, Castel Maggiore (IT)

(73) Assignee: Datalogic Mobile S.r.l., Lippo di Calderara di Reno (BO) (IT)

( * ) Notice: Subject to any disclaimer, the term of this patent is extended or adjusted under 35 U.S.C. 154(b) by 78 days.

(21) Appl. No.: 12/808,446

(22) PCT Filed: Dec. 21, 2007

(86) PCT No.: PCT/IB2007/004078
§ 371 (c)(1),
(2), (4) Date: Jun. 16, 2010

(87) PCT Pub. No.: WO2009/081223
PCT Pub. Date: Jul. 2, 2009

(65) Prior Publication Data
US 2010/0320271 A1  Dec. 23, 2010

(51) Int. Cl.
*G06K 7/00* (2006.01)
*G06K 7/10* (2006.01)
*G06K 9/22* (2006.01)

(52) U.S. Cl.
USPC ............... 235/439; 235/462.43; 235/462.44; 235/462.45; 235/472.01

(58) Field of Classification Search
USPC .................. 235/439, 462.43–462.45, 472.01
See application file for complete search history.

(56) References Cited

U.S. PATENT DOCUMENTS

| | | | |
|---|---|---|---|
| 5,349,497 A | 9/1994 | Hanson et al. | |
| 5,610,386 A * | 3/1997 | Ball et al. | 235/462.44 |
| 5,610,387 A * | 3/1997 | Bard et al. | 235/462.44 |
| 6,814,293 B2 * | 11/2004 | Curry et al. | 235/472.01 |
| 7,140,546 B1 | 11/2006 | Terlizzi et al. | |
| 2005/0205623 A1 * | 9/2005 | Buntain | 224/217 |
| 2007/0057069 A1 * | 3/2007 | Terlizzi et al. | 235/472.01 |
| 2007/0228173 A1 * | 10/2007 | White | 235/462.31 |

OTHER PUBLICATIONS

International Search Report dated Dec. 10, 2008 from corresponding International Application No. PCT/IB2007/004078, 2 pages.

* cited by examiner

*Primary Examiner* — Michael G Lee
*Assistant Examiner* — Laura Gudorf
(74) *Attorney, Agent, or Firm* — Duane Morris LLP

(57) ABSTRACT

A portable data collection apparatus includes an apparatus body and a retaining element arranged for connecting said apparatus body to a hand of a user, the retaining element being so shaped as to enable said apparatus body to rotate between a position in which the apparatus body is in contact with the palm of the hand and a further position in which the palm is free of the apparatus body, in the further position the apparatus body being supported by the hand by means of the retaining element.

35 Claims, 10 Drawing Sheets

PORTABLE DATA COLLECTION APPARATUS

FIELD OF THE INVENTION

The invention relates to a portable data collection apparatus, in particular a battery-operatable portable apparatus for the acquisition and possibly the management of data. The portable data collection device may be a mobile computer, or a PDT (portable data terminal) i.e. a portable terminal for the automatic or manual acquisition of data, or in general a portable automatic identification device such as a portable reader of optical information or a portable reader of encoded information stored in a transponder (generally part of a "tag" or label).

The portable data collection apparatus can be used, for example, in the field of object handling, or in the field of object storage, or in the field of object transportation by express couriers.

BACKGROUND OF THE INVENTION

Portable data collection apparatuses 100 are known, shown in FIGS. 1 and 2, which comprise a body 101 provided with a screen 102, with a keyboard 103 and with a cavity 104 arranged for receiving a supply battery 105. With the cavity 104 a closing door can be associated.

The portable data collection apparatuses 100 further comprise a strap 106 arranged for surrounding a hand 107 of a user which grasps the body 101. The strap 106 maintains the body 101 in contact with the hand 107 of the user.

The strap 106 is fixed to the body 101 and is positioned so as to extend above the cavity 104, so as to partially cover the supply battery 105.

A drawback of the apparatuses disclosed above is that in order to replace a discharged supply battery with a charged supply battery it is necessary to detach, at least partially, the strap 106 from the body 101 to access the cavity 104. This operation causes a loss of time and can be difficult, for example if the aforesaid user is wearing gloves.

In addition, the aforesaid user, if he has to perform a task requiring the use of both hands, for example transporting packages, or the like, first has to remove the portable data collection apparatus from the hand to which the portable data collection apparatus adhered owing to the strap and put the portable data collection apparatus away.

This is very inconvenient, as the portable data collection apparatus has to be positioned on the hand and removed from the latter a considerable number of times.

In addition, the portable data collection apparatus, once it has been removed from the hand, may fall to the ground or be easily subject to damage.

SUMMARY OF THE INVENTION

An object of the invention is to improve portable data collection apparatuses.

Another object is to obtain a portable data collection apparatus that can be connected to a hand of a user and does not prevent the user from performing tasks that require the aforesaid hand to be used.

A further object is to obtain a portable data collection apparatus in which a supply battery can be easily replaced.

In a first aspect of the invention, there is provided a portable data collection apparatus, comprising an apparatus body and a retaining element arranged for connecting said apparatus body to a hand of a user, characterised in that said retaining element is so shaped as to enable said apparatus body to rotate between a position in which said apparatus body is in contact with the palm of said hand and a further position in which said palm is free from said apparatus body, in said further position said apparatus body being supported by said hand by means of said retaining element.

Owing to this aspect of the invention, it is possible to obtain a portable data collection apparatus that can be maintained constantly connected to a hand of a user, this apparatus being able to assume a first configuration, in which the apparatus body rests on the palm of the hand of the user, and a second configuration, in which the apparatus body does not occupy the palm of the user. In the aforesaid second configuration, the apparatus body may, for example, rest on the back of the hand of the user. When the apparatus is in the aforesaid first configuration, the user may firmly grasp the apparatus body, for example during data collection operations. When the apparatus is in the aforesaid second configuration, the user can use the hand that—by means of the connecting element—supports the apparatus body, to perform a desired task, for example carrying objects, without having to remove the apparatus from the hand.

In an embodiment, the retaining element has dimensions such as to receive and wrap a sole finger—or two fingers—of the hand of the user. In this case, the apparatus body can rotate around the aforesaid finger—or around the aforesaid two fingers—so that the apparatus moves from the first configuration to the second configuration, or vice versa.

In a second aspect of the invention, there is provided a portable data collection apparatus, comprising an apparatus body provided with a cavity, said cavity defining an opening in a portion of a wall of said apparatus body and being arranged for receiving a battery for electrically supplying said apparatus, and a retaining element arranged for connecting said apparatus body to a hand of a user, characterised in that said retaining element extends completely above a remaining portion of said wall that is distinct from said portion.

Owing to this aspect of the invention, it is possible to obtain a portable data collection apparatus in which the retaining element does not extend above the cavity intended to receive the battery. In this manner, a discharged battery can be removed from the apparatus body—and replaced—without the retaining element having to be removed from the apparatus body. In particular, it is possible to remove and replace the battery without removing the apparatus from the hand.

In an embodiment, the retaining element has such dimensions as to receive and wrap a sole finger—or two fingers—of the hand of the user. In this case, the retaining element has smaller overall dimensions than the retaining elements of known data collection apparatuses and does not occupy the cavity, so hampering access thereto.

BRIEF DESCRIPTION OF THE DRAWINGS

The invention can be better understood and implemented with reference to the attached drawings, which illustrate some embodiments thereof by way of non-limiting example, in which.

DETAILED DESCRIPTION

Figure 1:
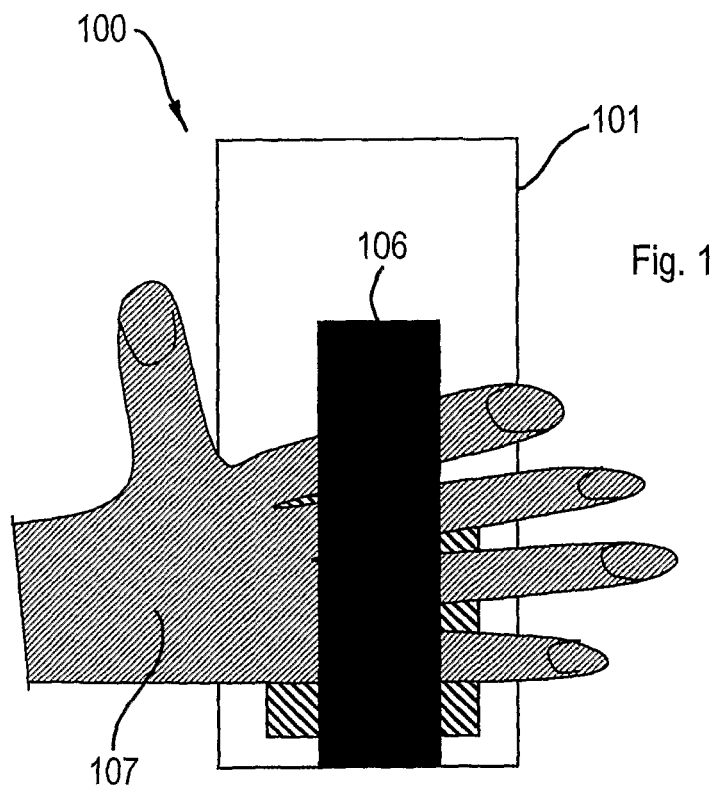
FIG. 1 is a front view of a rear part of a portable data collection apparatus according to prior art in an operating configuration.
Figure 2:
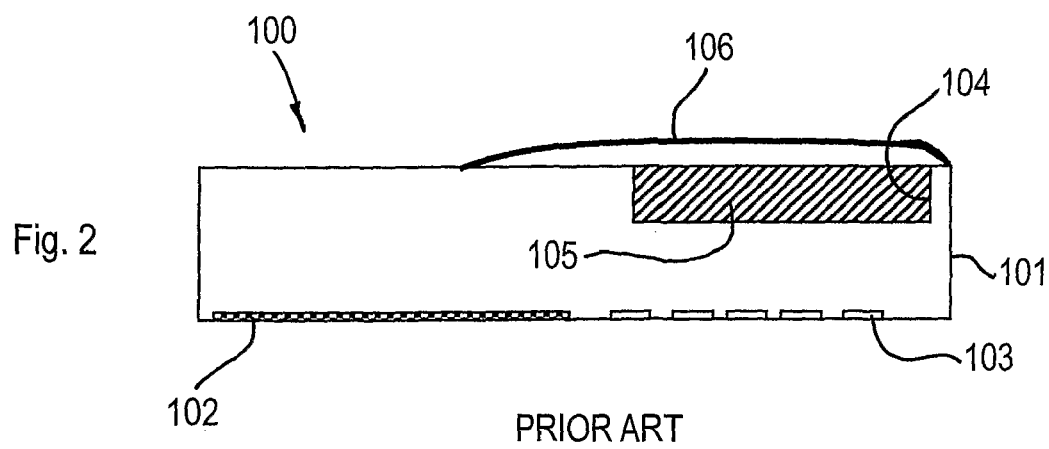
FIG. 2 is a side view of the portable data collection apparatus in FIG. 1.

With reference to FIGS. 3 to 10, there is shown a portable data collection apparatus 1.

The expression "data collection apparatus" is used in the present description and in the claims to indicate any device suitable for acquiring data associated with objects, such as identifying data thereof, or in manual mode by an operator (for example by keying in using a portable terminal) or in automatic mode (by reading optical information or tags associated with said objects). The portable data collection apparatus may be a PDT (portable data terminal) i.e. a portable terminal for acquiring data manually or automatically, or, in general, a device for automatically identifying and acquiring data such as a portable reader of optical information or a portable reader of information stored in tags.

The data collection apparatus 1 is in particular a reading apparatus for reading optical information and/or information that is encoded and stored in tags. As is known, the tags can be read and/or written by radio-frequency reading and/or writing devices (better known as RFID readers).

The expression "optical information" is used in the present description to indicate any graphic representation having the function of storing coded or non coded information. A particular example of optical information consists of linear or two-dimensional optical codes in which the information is encoded by suitable combinations of elements of prefixed shape, for example squares, rectangles or hexagons, of a dark colour (normally black) separated by clear elements (spaces, normally white), such as barcodes, stacked codes and two-dimensional codes in general, colour codes, etc. The term "optical information" further comprises, more in general, also other graphic shapes, including printed characters (letters, numbers, etc) and particular patterns (such as, for example stamps, logos, signatures, fingerprints, etc). The term "optical information" comprises graphic representations that are detectable along the entire wavelength comprised between infrared and ultraviolet, and thus not only in the visible light range.

In the present description the expression "portable reading apparatus" means a portable device that is capable of reading tags and/or optical information, by means of a plurality of possible acquisition techniques.

For example, acquisition may be by illuminating a subject, collecting, by an appropriate optical receiving apparatus, light diffused by the subject on a sensor consisting of an array of photosensitive elements of linear or matrix type, for example of CCD or CMOS type, and generating an image signal by means of electronics integrated in or associated with the sensor. The generated image signal, in analogue or digital form, can then be processed in the same device or in a separate image-processing device.

Typically, in reading devices for reading encoded optical information such as barcodes and optical codes in general, the image signal in digital form is decoded to extract the information contents of the code.

Devices of this type are known as linear or matrix television cameras or cameras, and in the case of reading of optical information, are also known as "imager" type readers.

According to another technique, acquisition can occur by illuminating a subject by scanning one or more laser beams, collecting the light diffused or reflected by the subject onto one or more photodiodes by an optical receiving device and generating, by dedicated electronics, an electric image signal representing the diffusion/reflection of each point of the subject hit by the laser beam during scanning. This signal is then processed, and, in particular for reading devices for reading encoded optical information, is digitised and decoded. Devices of this type are generally known as "laser scanners". Instead of capturing an image with a single simultaneous acquisition for all the photosensitive elements ("parallel"), as in television cameras and in "imager" readers, in "laser scanners" the image of the subject during scanning is captured in a sequential manner instant by instant ("serially").

For reading tags, on the other hand, the reading device generates an electromagnetic field at an excitation frequency for the transponder contained in the tag that, when it has entered this field, transmits to the reading device a signal containing the code stored in the transponder. A similar method is used for writing information in the transponder.

The apparatus 1 comprises an apparatus body 2 provided with a screen 3 and with a keyboard 4. The screen 3 and the keyboard 4 partially occupy a front face 8 of the apparatus body 2.

The apparatus 1 further comprises a cavity 5 arranged for receiving a battery 6. The cavity 5 partially occupies a rear face 9 of the apparatus body 2. The cavity 5 defines in a portion 32 of the rear face 9 an opening 33. There can be provided a door 48 arranged for closing the opening 33.

The apparatus 1 further comprises a retaining element 7 so shaped as to enable the apparatus body 2 to rotate between a position in which the apparatus body is in contact with the palm 13 of a hand 11 of a user and a further position in which the apparatus body 2 does not interact with the palm 13 and the palm 13 is, therefore, free of the apparatus body 2.

This does not occur with the retaining elements of known apparatuses—i.e. with the straps 106 disclosed above—which do not allow the apparatus body to rotate with respect to the hand.

The retaining element 7 can receive from one to four fingers of the user.

As shown in FIGS. 3 to 8, the retaining element is so shaped as to wind a finger, in particular the index finger 10 of the hand 11 of the user.

In an embodiment that is not shown, the retaining element is so shaped as to wind two fingers, in particular the index finger and the middle finger of the hand of the user.

The retaining element 7 can be made from an elastically deformable material.

The retaining element 7 comprises a ring 12 connected to the rear face 9.

An internal surface of the ring 12 can be coated with a material having a low friction coefficient to promote rotation of the apparatus body around the finger.

The retaining element 7 extends completely on a remaining portion 34 of the rear face 9 that is distinct from the portion 32. The retaining element 7 does not therefore extend above the cavity 5, i.e. the retaining element 7 does not occupy the opening 33.

This is made possible by the fact that the retaining element has a smaller extent than the extent of the retaining elements—i.e. of the straps 106—of the known apparatuses. In this manner, the battery 6, when discharged, can be removed and replaced with a further charged battery without the retaining element 7 having to be removed, even partially, from the apparatus body 2.

This enables the battery 6 to be replaced in a very simple and fast manner. In particular, the battery 6 can be replaced without the apparatus 1 having to be removed from the hand of the user.

Alternatively, according to an embodiment that is not shown, the ring 12 can be fixed (by means of seam, rivet or automatic button) to a strap of known type, i.e. to a strap that extends above the cavity 5.

In this case, the apparatus body 2 can rotate with respect to the finger—or to the fingers—received inside the ring 12. To remove and replace the battery 6, however, it is necessary to separate the aforesaid strap from the apparatus body 2.

Figure 7:
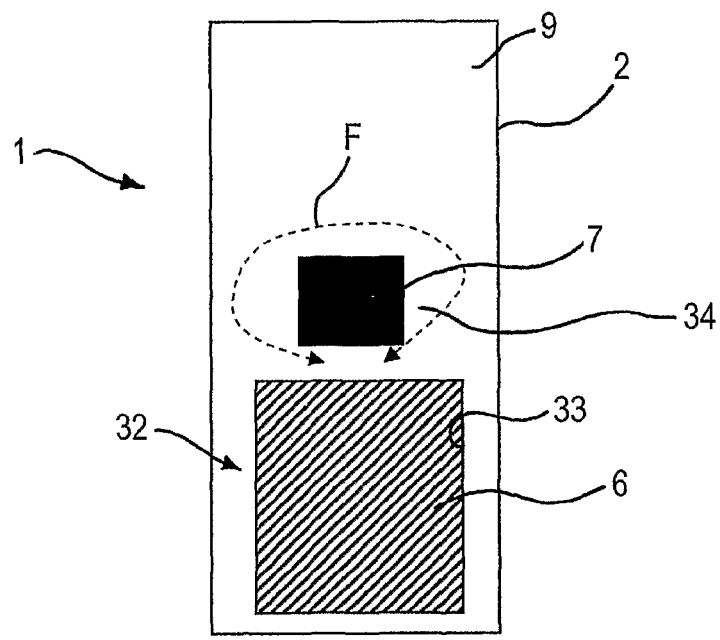
FIG. 7 is a front view of a rear part of a portable data collection apparatus made according to a version.
Figure 8:
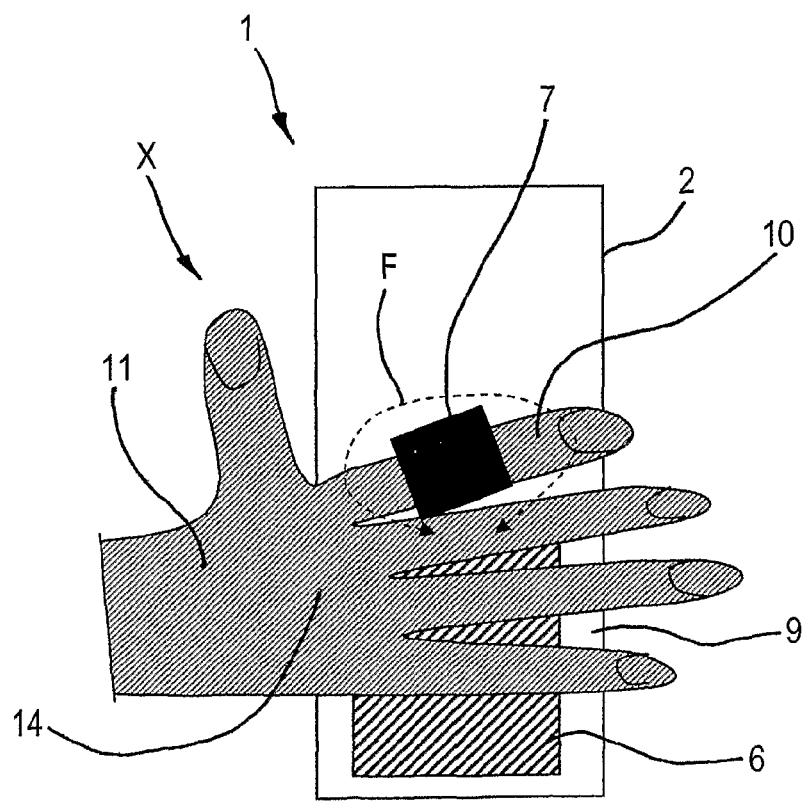
FIG. 8 is a view like the one in FIG. 7 that shows the portable data collection apparatus in an operating configuration.
Figure 9:
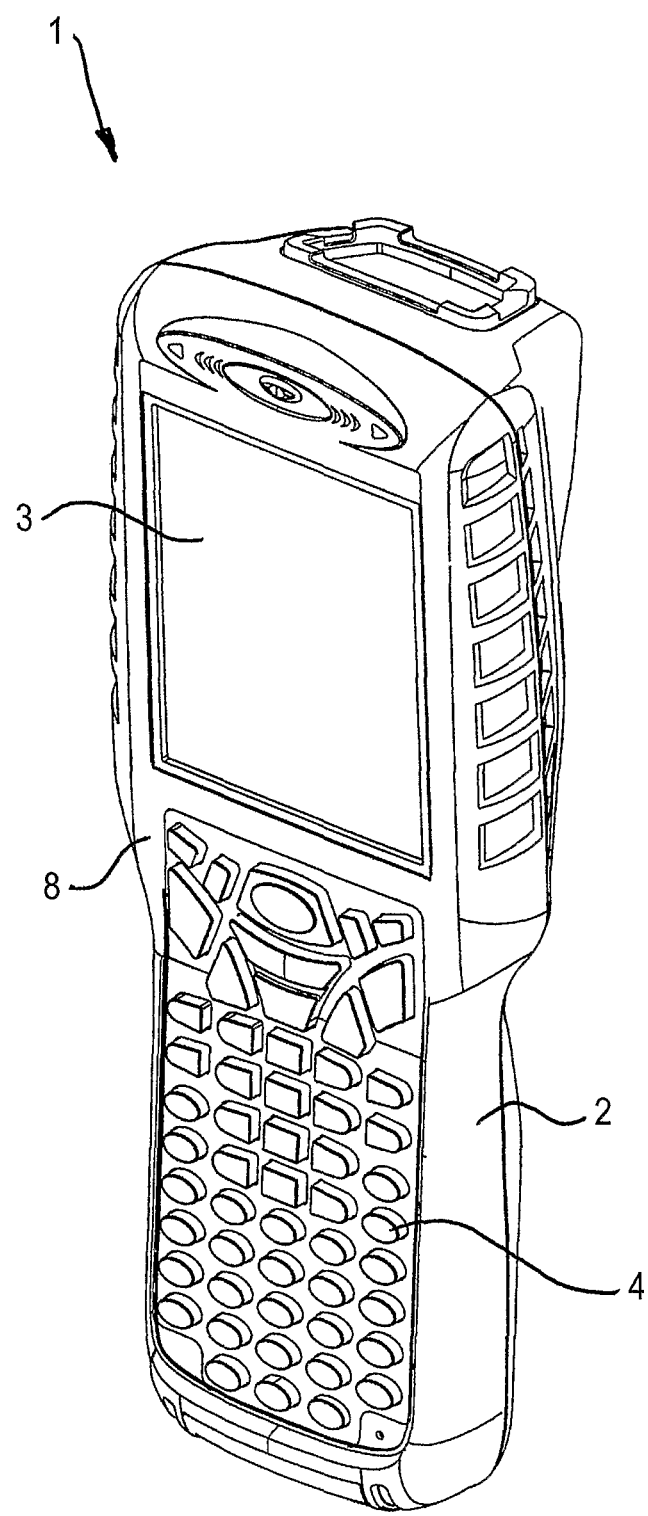
FIG. 9 is a perspective front view of a portable data collection apparatus made according to a further version.
Figure 10:
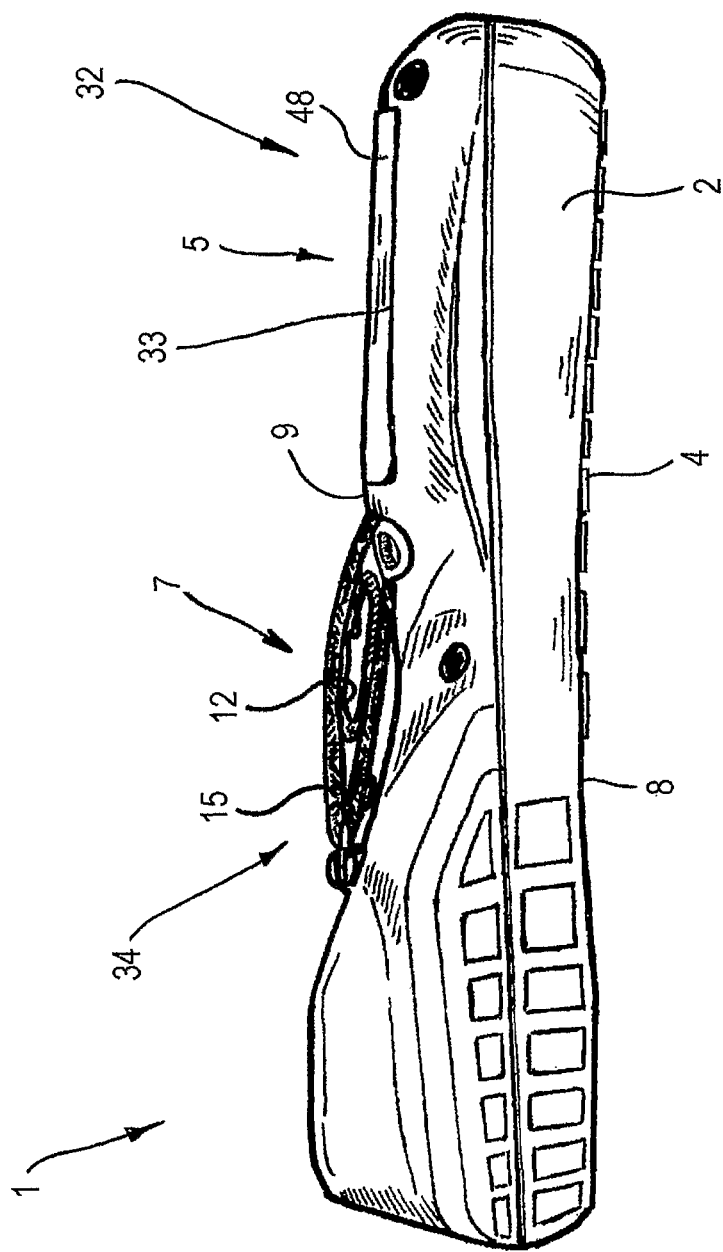
FIG. 10 is a perspective side view of the data collection apparatus in FIG. 9.
Figure 11:
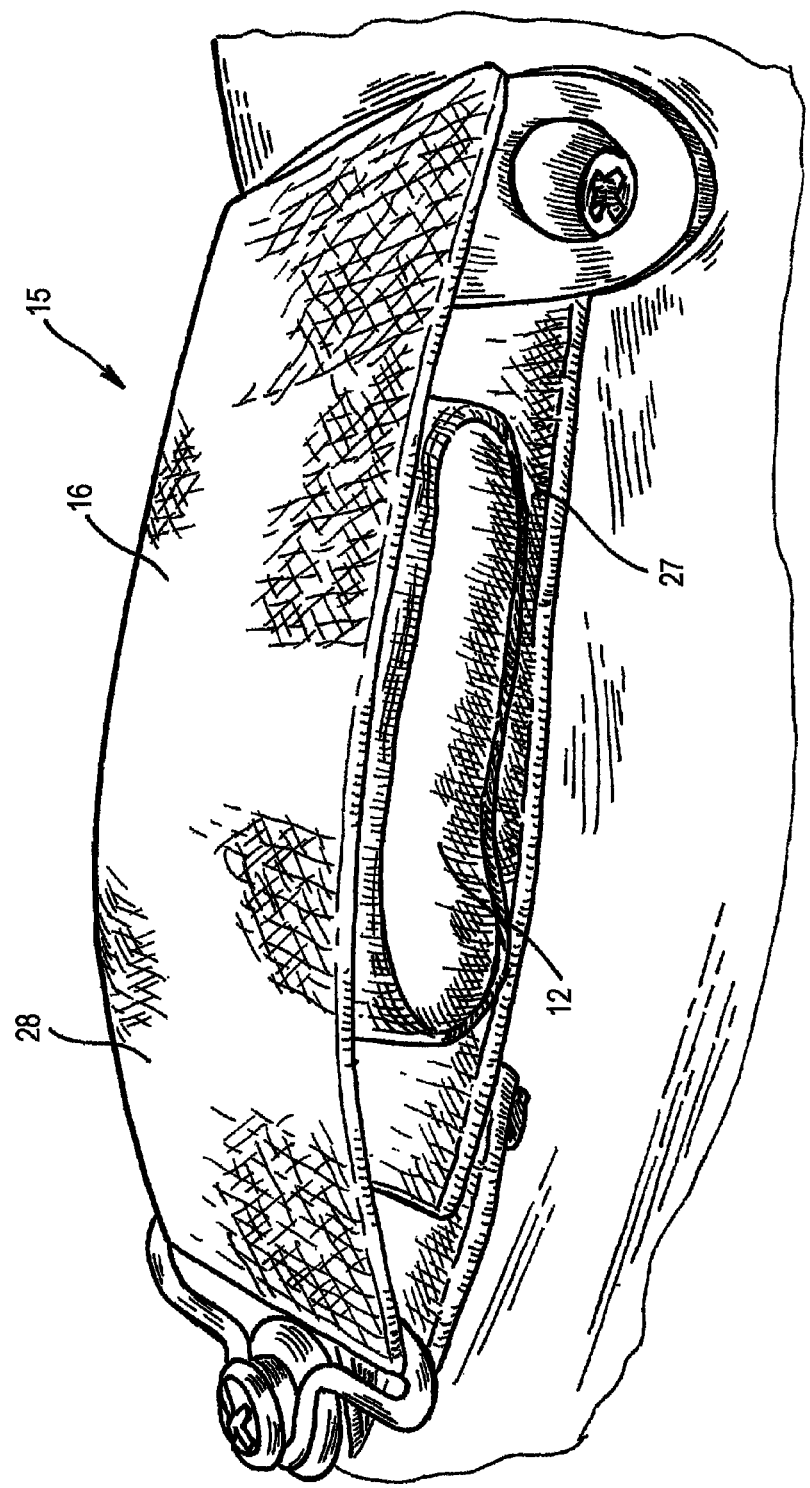
FIG. 11 is a perspective side view of a retaining element of the portable data collection apparatus in FIG. 9.
Figure 12:
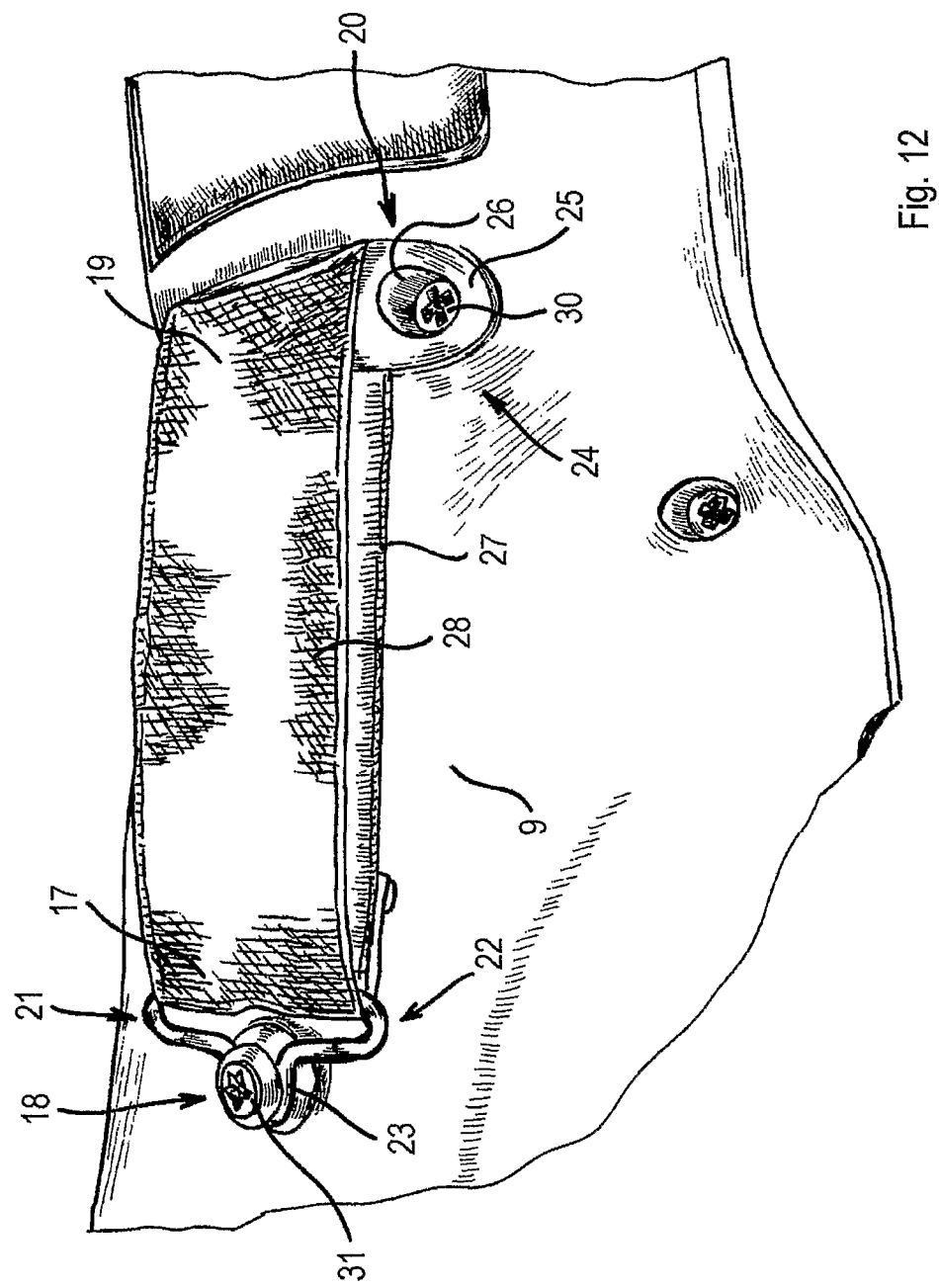
FIG. 12 is a further perspective side view of a retaining element of the portable data collection apparatus of FIG. 9.

As shown in FIGS. 7 and 8, the retaining element 7 can be connected to the apparatus body 2 so as to be rotatable with respect to the apparatus body 2. The retaining element 7 may rotate, as indicated by the arrow F, around an axis arranged transversely—and, in particular, substantially perpendicularly—to the rear face 9. In this case, the retaining element 7 can be connected to the apparatus body 2 by connecting devices that enable the retaining element 7 to be rotated, such as buttons, screws and the like.

In this manner, the position of the retaining element 7 can be adjusted to adapt to the shape of the hand 11—in particular to the shape and the position of the fingers—of the user.

In addition, the retaining element 7 can be adjusted so as to vary the diameter of the ring 12 defined thereby. In this case, the ring can be made at least partially of Velcro®.

In this manner, the dimensions of the ring 12 can be adapted to those of the index finger 10 of the user.

The user inserts the index finger 10 inside the ring 12 so that the apparatus 1 is efficaciously connected to the hand 11.

Figure 3:
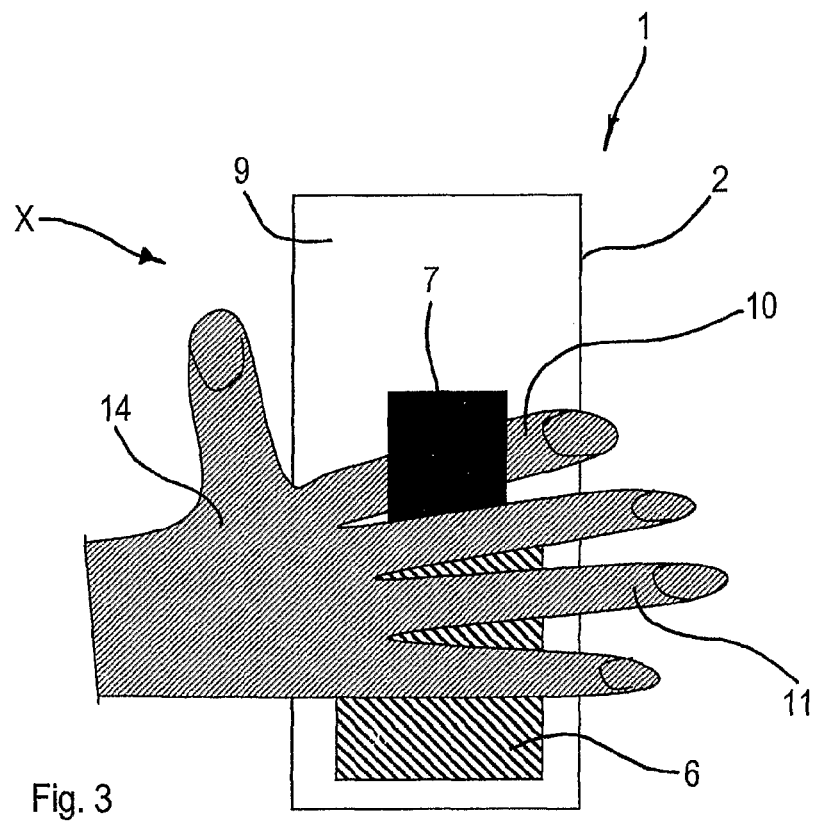
FIG. 3 is a front view of a rear part of a portable data collection apparatus in an operating configuration.
Figure 4:
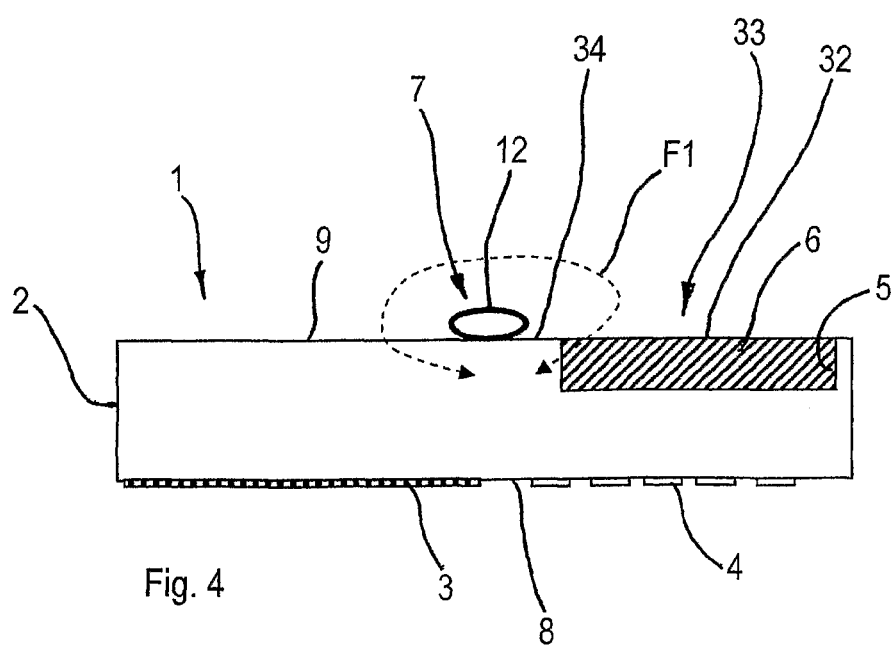
FIG. 4 is a side view of the portable data collection apparatus in FIG. 3.

The apparatus 1 may assume an operating configuration X, shown in FIGS. 3 and 8, in which the rear face 9 rests on the palm 13 of the hand 11, so that the apparatus body 2 can be firmly gripped by the user.

In the operating configuration X, the user can view data via the screen 3 and or input data via the keyboard 4.

Figure 5:
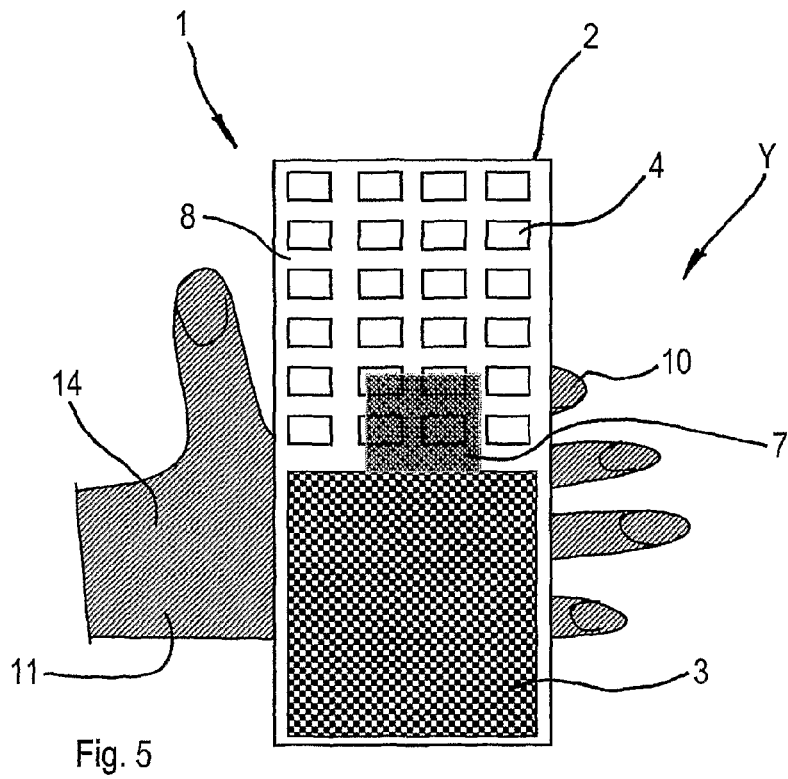
FIG. 5 is a front view of a front part of the portable data collection apparatus in FIG. 3 in a carrying configuration.
Figure 6:
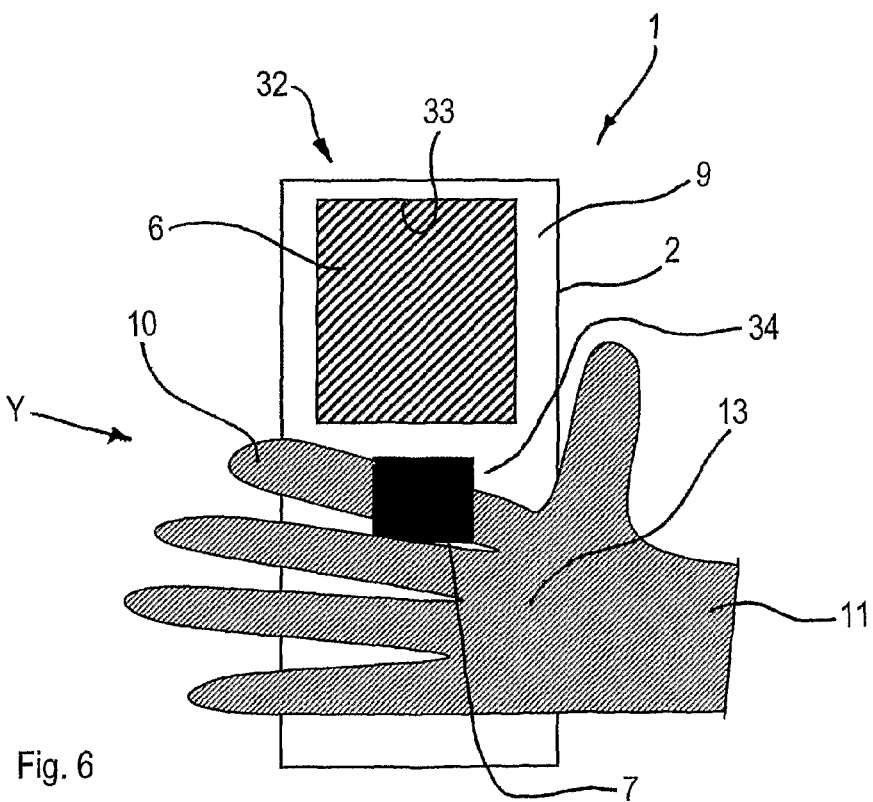
FIG. 6 is a front view of the rear part of the portable data collection apparatus in the carrying configuration.

The apparatus 1 may further assume a carrying configuration Y, shown in FIGS. 5 and 6, in which the rear face 9 rests on the back 14 of the hand 11, so that the user can use the hand 11 to perform a desired operation, for example moving an object.

In the carrying configuration Y, the apparatus 1 is maintained connected to the hand 11 by the retaining element without it being necessary for the user to grasp the apparatus body 2. In the carrying configuration Y the weight of the apparatus 1 is supported by the retaining element 7.

The apparatus 1 can therefore be maintained constantly on the hand 11, in particular even if the user has to perform an operation that requires the use of both hands.

The apparatus 1, not having to be removed from the hand 11, is less subject to risks of falling and damage in general.

In order to move the apparatus 1 from the operating configuration X to the carrying configuration Y, and vice versa, the apparatus body 2 is rotated around the index finger 10, as shown by the arrow F1.

With reference to FIGS. 10 to 13 there is shown an embodiment of the apparatus 1 in which the retaining element 7 comprises a band 15 to which the ring 12 is fixed.

The band 15 is shaped as a flattened tubular element 16 that receives internally the ring 12 and connects the ring 12 to the apparatus body 2.

The tubular element 16 comprises a first end 17 connected to a first zone 18 of the rear face 9 and a second end 19 connected to a second zone 20 of the rear face 9.

The apparatus 1 comprises a first connecting element 21 that connects the first end 17 to the first zone 18. The first connecting element 21 is provided with a slot 22 arranged for receiving the first end 17 and with an appendage 23 rotatingly coupled with a protruding element 31 that projects from the rear face 9 at the first zone 18. The first connecting element 21, owing to the appendage 23, enables the tubular element 16 to move with respect to the apparatus body 2 to adapt to the shape and the dimensions of the hand of the user.

The apparatus 1 further comprises a second connecting element 24 that connects the second end 19 to the second zone 20. The second connecting element 24 comprises a locking body 25 that is inserted inside the tubular element 16, at the second end 19, and is fixed to the rear face 9. The locking body 25 is provided, at opposite ends, with holes 26 arranged for receiving screws 30 that connect the locking body 25 to the apparatus body 2.

The ring 12 can be fixed, for example sewn, to a first portion 27 of the tubular element 16 that is nearer the rear face 9, or to a second portion 28 of the tubular element 16 that is further from the rear face 9, or both to the first portion 27 and to the second portion 28.

Figure 13:
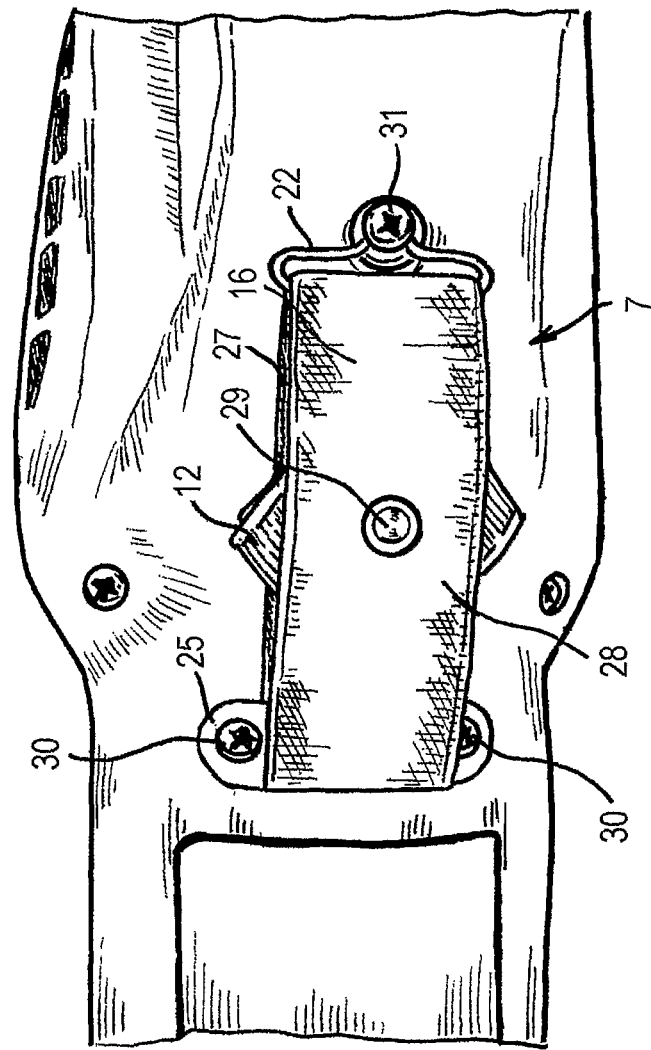
FIG. 13 is a perspective top view of a retaining element of the portable data collection apparatus in FIG. 9 made according to a version.

As shown in FIG. 13, the ring 12 can be fixed to the tubular element 16 by a rivet 29—or an automatic button—that enables the ring 12 to rotate with respect to the tubular element 16 so as to be more comfortable for the user. Alternatively, there can be provided two rivets—or two automatic buttons—arranged for connecting the ring 12 both to the first portion 27 and to the second portion 28.

Figure 14:
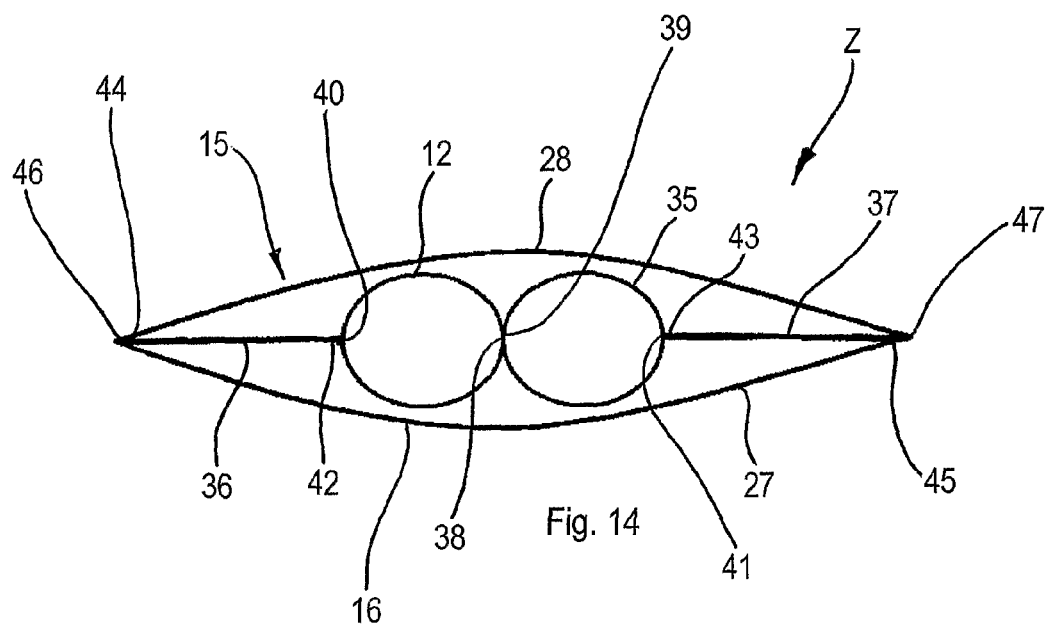
FIG. 14 is a schematic side view of a retaining element in an operating position.
Figure 15:
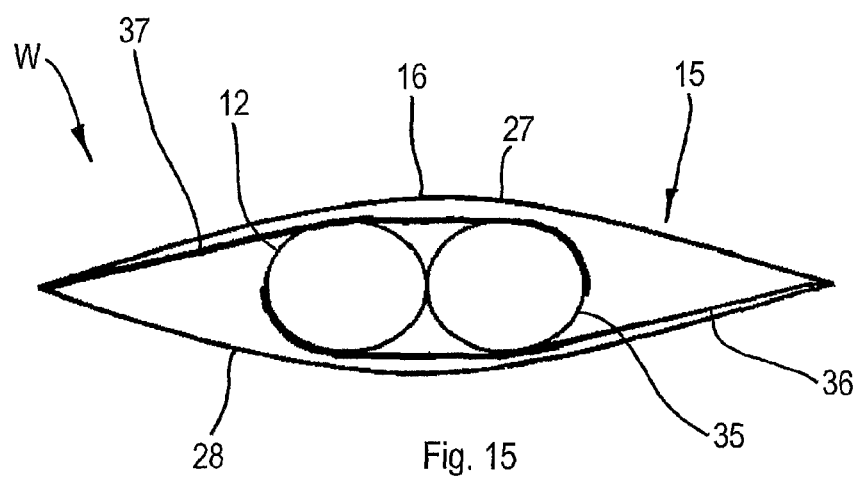
FIG. 15 is a view like the one in FIG. 14 that shows the retaining element in a further operating position.

With reference to FIGS. 14 and 15, there is shown a retaining element 7 comprising the ring 12 and a further ring 35 arranged for receiving and winding another finger of the hand 11, in particular the middle finger.

The ring 12 and the further ring 35 are positioned inside a band 15, for example of the type disclosed with reference to FIGS. 10 to 13, i.e. a band shaped as a flattened tubular element 16.

The ring 12 and the further ring 35 are mutually fixed and are connected to the band 15—such as to be movable with respect to the band 15—by a first strip 36 and a second strip 37.

A first peripheral zone 38 of the ring 12 is fixed to a further first peripheral zone 39 of the further ring 35.

The ring 12 comprises a second peripheral zone 40, for example opposite the first peripheral zone 38, fixed to an end 42 of the first strip 36. A further end 44 of the first strip 36 is fixed to the band 15 in a zone 46 interposed between the first portion 27 and the second portion 28.

The further ring 35 comprises a further second peripheral zone 41, for example opposite the further first peripheral zone 39, fixed to an end 43 of the second strip 37. A further end 45 of the second strip 37 is fixed to the band 15 in a further zone 47 interposed between the first portion 27 and the second portion 28.

The retaining element 7 may assume a rest position Z, shown in FIG. 14 and a rotated position W, shown in FIG. 15.

In the rest position Z the first strip 36 and the second strip 37 are substantially coplanar.

In the rotated position W the first strip 36 and the second strip 37 wind, at least partially, the ring 12 and the further ring 35.

In particular, the retaining element 7 can assume the rest position Z when the rear face 9 of the apparatus body 2 rests on the palm 13 of the hand 11, i.e. when the apparatus assumes the operating configuration X, and the rotated position W when the rear face 9 of the apparatus body 2 rests on the back 14 of the hand 11, i.e. when the apparatus 1 assumes the carrying configuration Y.

When the retaining element 7 is moved from the rest position Z to the rotated position W, and vice versa, the band 15, and therefore the apparatus body 2 fixed thereto, rotate around the fingers—in particular the index finger and the middle finger—of the user that are received in the ring 12 and in the further ring 35.

The first strip 36 and the second strip 37 are made of elastically deformable material.

When the retaining element 7 moves from the rest position Z to the rotated position W, the first strip 36 and the second strip 37 are deformed, as appears from the comparison between FIG. 14 and FIG. 15.

Also the ring 12, the further ring 35 and the band 15 may be made of elastically deformable material.

The retaining element 7, when it is in the rotated position W, is subjected to a force—exerted by the first strip 36 and by the second strip 37—that tends to make the retaining element 7 return to the rest configuration Z.

The aforesaid force is overcome by the first portion 27 and by the second portion 28, which tend to approach one another, and by the weight of the apparatus body 2.

In an embodiment that is not shown, the retaining element 7 comprises the ring 12 and a further ring arranged for receiving and winding at least another finger of the hand 11, in particular other three fingers of the hand 11, i.e. the middle finger, the ring finger and the little finger.

In this case, the user can insert the other three fingers inside the further ring when the apparatus body 2 has to be grasped firmly and extract the other three fingers from the further ring—maintaining the index finger inside the ring 12—when the apparatus body 2 has to be rotated around the index finger.

The ring 12 and the further ring are positioned side by side. The further ring can be received inside the band 15 together with the ring 12.

The further ring can be fixed to the band 15 similarly to what has been disclosed with reference to the ring 12.

What is claimed is:

1. A system, comprising:
a battery operated portable computing apparatus having an apparatus body and a retaining element coupled to said battery operated portable apparatus, the retaining element arranged for coupling said apparatus body to a hand of a user, wherein said retaining element is coupled to a rear face of said apparatus body and is so shaped as to enable said apparatus body to rotate between a position in which said apparatus body is seated in the palm of said hand, and a further position in which said palm is free from said apparatus body, said rear face resting on the back of said hand, in said further position said apparatus body being supported by said hand by means of said retaining element,
wherein said retaining element comprises a ring and wherein said retaining element comprises a band to which said ring is fixed, said band comprising a first end fixed to a first zone of said apparatus body and a second end fixed to a second zone of said apparatus body.

2. A portable data collection apparatus, comprising an apparatus body and a retaining element arranged for connecting said apparatus body to a hand of a user, wherein said retaining element is so shaped as to enable said apparatus body to rotate between a position in which said apparatus body is in contact with a palm of said hand and a further position in which said palm is free from said apparatus body, in said further position said apparatus body being supported by said hand by means of said retaining element, wherein said retaining element comprises a ring and wherein said retaining element comprises a band to which said ring is fixed, said band comprising a first end fixed to a first zone of said apparatus body and a second end fixed to a second zone of said apparatus body.

3. The portable data collection apparatus according to claim 2, wherein said retaining element is rotatable with respect to said apparatus body.

4. The portable data collection apparatus according to claim 2, and further comprising adjusting means for varying a diameter of said ring.

5. The portable data collection apparatus according to claim 2, and further comprising a connecting element provided with a slot arranged for receiving said first end and with an appendage rotatingly coupled with a protruding element that projects from said apparatus body at said first zone.

6. The portable data collection apparatus according to claim 5, and further comprising a further connecting element provided with a locking body associable with said band and connectable to said apparatus body at said second zone.

7. The portable data collection apparatus according to claim 2, and further comprising a further ring, said ring being so shaped as to receive and wind an index finger of said hand and said further ring being so shaped as to receive and wind at least another finger of said hand.

8. The portable data collection apparatus according to claim 7, wherein said ring and said further ring are mutually connected and are fixed to a band by a first strip and a second strip.

9. The portable data collection apparatus according to claim 8, wherein said first strip and said second strip are made of elastically deformable material so as to enable said ring and said further ring to move with respect to said band.

10. The portable data collection apparatus according to claim 8, wherein a first peripheral zone of said ring is fixed to a further first peripheral zone of said further ring, a second peripheral zone of said ring is fixed to said first strip and a further second peripheral zone of said further ring is fixed to said second strip.

11. The portable data collection apparatus according to claim 2, wherein said apparatus body is provided with a cavity, said cavity defining an opening in a portion of a wall of said apparatus body and being arranged for receiving a battery for electrically supplying said apparatus, said retaining element extending completely on a remaining portion of said wall that is distinct from said portion.

12. The portable data collection apparatus according to claim 11, wherein said wall is a rear wall of said apparatus body.

13. The portable data collection apparatus according to claim 2, wherein said retaining element is made of elastically deformable material.

14. A portable data collection apparatus, comprising an apparatus body and a retaining element arranged for connecting said apparatus body to a hand of a user, wherein said retaining element is so shaped as to enable said apparatus body to rotate between a position in which said apparatus body is in contact with a palm of said hand and a further position in which said palm is free from said apparatus body, in said further position said apparatus body being supported by said hand by means of said retaining element, wherein said retaining element comprises a ring, wherein said retaining element comprises a band to which said ring is fixed, wherein said band is shaped as a flattened tubular element inside which said ring is received.

15. The portable data collection apparatus according to claim 14, wherein said tubular element includes a first portion proximate said apparatus body and a second portion further from said apparatus body than said first portion, wherein said ring is fixed to the first portion of said tubular element.

16. The portable data collection apparatus according to claim 14, wherein said tubular element includes a first portion proximate said apparatus body and a second portion further from said apparatus body than said first portion, wherein said ring is fixed to the second portion of said tubular element.

17. The portable data collection apparatus according to claim 14, and further comprising adjusting means for varying a diameter of said ring.

18. The portable data collection apparatus according to claim 14, and further comprising a further ring, said ring being so shaped as to receive and wind an index finger of said hand and said further ring being so shaped as to receive and wind at least another finger of said hand.

19. The portable data collection apparatus according to claim 18, wherein said ring and said further ring are mutually connected and are fixed to a band by a first strip and a second strip.

20. The portable data collection apparatus according to claim 19, wherein said first strip and said second strip are made of elastically deformable material so as to enable said ring and said further ring to move with respect to said band.

21. The portable data collection apparatus according to claim 19, wherein a first peripheral zone of said ring is fixed to a further first peripheral zone of said further ring, a second peripheral zone of said ring is fixed to said first strip and a further second peripheral zone of said further ring is fixed to said second strip.

22. The portable data collection apparatus according to claim 14, wherein said apparatus body is provided with a cavity, said cavity defining an opening in a portion of a wall of said apparatus body and being arranged for receiving a battery for electrically supplying said apparatus, said retaining element extending completely on a remaining portion of said wall that is distinct from said portion.

23. The portable data collection apparatus according to claim 22, wherein said wall is a rear wall of said apparatus body.

24. The portable data collection apparatus according to claim 14, wherein said retaining element is made of elastically deformable material.

25. A portable data collection apparatus, comprising an apparatus body and a retaining element arranged for connecting said apparatus body to a hand of a user, wherein said retaining element is so shaped as to enable said apparatus body to rotate between a position in which said apparatus body is in contact with a palm of said hand and a further position in which said palm is free from said apparatus body, in said further position said apparatus body being supported by said hand by means of said retaining element, wherein said retaining element comprises a ring, wherein said retaining element comprises a band to which said ring is fixed, said ring being rotatably supported by said band.

26. The portable data collection apparatus according to claim 25, and further comprising adjusting means for varying a diameter of said ring.

27. The portable data collection apparatus according to claim 25, and further comprising a further ring, said ring being so shaped as to receive and wind an index finger of said hand and said further ring being so shaped as to receive and wind at least another finger of said hand.

28. The portable data collection apparatus according to claim 27, wherein said ring and said further ring are mutually connected and are fixed to a band by a first strip and a second strip.

29. The portable data collection apparatus according to claim 28, wherein said first strip and said second strip are made of elastically deformable material so as to enable said ring and said further ring to move with respect to said band.

30. The portable data collection apparatus according to claim 28, wherein a first peripheral zone of said ring is fixed to a further first peripheral zone of said further ring, a second peripheral zone of said ring is fixed to said first strip and a further second peripheral zone of said further ring is fixed to said second strip.

31. The portable data collection apparatus according to claim 25, wherein said apparatus body is provided with a cavity, said cavity defining an opening in a portion of a wall of said apparatus body and being arranged for receiving a battery for electrically supplying said apparatus, said retaining element extending completely on a remaining portion of said wall that is distinct from said portion.

32. The portable data collection apparatus according to claim 31, wherein said wall is a rear wall of said apparatus body.

33. The portable data collection apparatus according to claim 25, wherein said retaining element is made of elastically deformable material.

34. A system, comprising:
a battery operated portable computing apparatus having an apparatus body and a retaining element coupled to said battery operated portable apparatus, the retaining element arranged for coupling said apparatus body to a hand of a user, wherein said retaining element is coupled to a rear face of said apparatus body and is so shaped as to enable said apparatus body to rotate between a position in which said apparatus body is seated in the palm of said hand, and a further position in which said palm is free from said apparatus body, said rear face resting on the back of said hand, in said further position said apparatus body being supported by said hand by means of said retaining element,
wherein said retaining element comprises a ring, wherein said retaining element comprises a band to which said ring is fixed, said ring being rotatably supported by said band.

35. A system, comprising:
a battery operated portable computing apparatus having an apparatus body and a retaining element coupled to said battery operated portable apparatus, the retaining element arranged for coupling said apparatus body to a hand of a user, wherein said retaining element is coupled to a rear face of said apparatus body and is so shaped as to enable said apparatus body to rotate between a position in which said apparatus body is seated in the palm of said hand, and a further position in which said palm is free from said apparatus body, said rear face resting on the back of said hand, in said further position said apparatus body being supported by said hand by means of said retaining element, wherein said retaining element comprises a band to which said ring is fixed, wherein said band is shaped as a flattened tubular element inside which said ring is received.

* * * * *